(12) United States Patent
Kendall et al.

(10) Patent No.: US 11,230,227 B2
(45) Date of Patent: *Jan. 25, 2022

(54) MIRROR ASSEMBLY WITH SPRING-LOADED ELECTRICAL CONNECTORS

(71) Applicant: MAGNA MIRRORS OF AMERICA, INC., Holland, MI (US)

(72) Inventors: Craig Kendall, Grand Haven, MI (US); Michael J. Baur, Kentwood, MI (US); Hans J. Fuchs, Dorfprozelten (DE)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 139 days.

This patent is subject to a terminal disclaimer.

(21) Appl. No.: 16/668,029

(22) Filed: Oct. 30, 2019

(65) Prior Publication Data

US 2020/0064704 A1    Feb. 27, 2020

Related U.S. Application Data

(63) Continuation of application No. 15/478,273, filed on Apr. 4, 2017, now Pat. No. 10,466,563, which is a continuation-in-part of application No. 15/051,824, filed on Feb. 24, 2016, now Pat. No. 9,878,669.

(60) Provisional application No. 62/319,012, filed on Apr. 6, 2016, provisional application No. 62/198,881, filed on Jul. 30, 2015, provisional application No. 62/169,705, filed on Jun. 2, 2015, provisional application No. 62/120,039, filed on Feb. 24, 2015.

(51) Int. Cl.
*B60R 1/06* (2006.01)
*G02F 1/153* (2006.01)
*B60R 1/08* (2006.01)

(52) U.S. Cl.
CPC ............. *B60R 1/06* (2013.01); *B60R 1/088* (2013.01); *G02F 1/153* (2013.01); *G02F 2201/465* (2013.01); *G02F 2203/02* (2013.01)

(58) Field of Classification Search
CPC . B60R 1/06; B60R 1/088; G02F 1/153; G02F 2201/468; G02F 2203/02
USPC ........................................................ 359/265
See application file for complete search history.

(56) References Cited

U.S. PATENT DOCUMENTS

| | | |
|---|---|---|
| 4,712,879 A | 12/1987 | Lynam et al. |
| 4,882,466 A | 11/1989 | Friel |
| 5,066,112 A | 11/1991 | Lynam et al. |

(Continued)

*Primary Examiner* — Kristina M Deherrera
(74) *Attorney, Agent, or Firm* — Honigman LLP

(57) ABSTRACT

An exterior rearview mirror assembly for a vehicle includes a mirror reflective element, a back plate, and an attaching element having first and second spring-loaded electrical connectors disposed thereat. The attaching element includes a cover element with the spring-loaded electrical connectors disposed thereat. The attaching element includes electrical leads that electrically connect to the spring-loaded electrical connectors and that electrically connect to an electrical connector. With the cover element attached at the attachment portion of the back plate, and with the back plate attached at the rear side of the mirror reflective element, the spring-loaded electrical connectors contact and are biased into electrical contact with respective electrically conductive elements disposed at the rear side of the mirror reflective element, and the electrical connector is disposed at the back plate and configured to electrically connect to a connector of a wire harness of the mirror assembly or of the vehicle.

27 Claims, 9 Drawing Sheets

(56) References Cited

U.S. PATENT DOCUMENTS

| | | |
|---|---|---|
| 5,073,012 A | 12/1991 | Lynam |
| 5,076,673 A | 12/1991 | Lynam et al. |
| 5,115,346 A | 5/1992 | Lynam |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,253,109 A | 10/1993 | O'Farrell et al. |
| 5,406,414 A | 4/1995 | O'Farrell et al. |
| 5,525,264 A | 6/1996 | Cronin et al. |
| 5,567,360 A | 10/1996 | Varaprasad et al. |
| 5,610,756 A | 3/1997 | Lynam et al. |
| 5,668,663 A | 9/1997 | Varaprasad et al. |
| 5,724,187 A | 3/1998 | Varaprasad et al. |
| 5,798,688 A | 8/1998 | Schofield |
| 5,910,854 A | 6/1999 | Varaprasad et al. |
| 6,002,511 A | 12/1999 | Varaprasad et al. |
| 6,154,306 A | 11/2000 | Varaprasad et al. |
| 6,178,034 B1 | 1/2001 | Allemand et al. |
| 6,329,925 B1 | 12/2001 | Skiver et al. |
| 6,690,268 B2 | 2/2004 | Schofield et al. |
| 7,184,190 B2 | 2/2007 | McCabe et al. |
| 7,195,381 B2 | 3/2007 | Lynam et al. |
| 7,249,860 B2 | 7/2007 | Kulas et al. |
| 7,255,451 B2 | 8/2007 | McCabe et al. |
| 7,274,501 B2 | 9/2007 | McCabe et al. |
| 7,360,932 B2 | 4/2008 | Uken et al. |
| 7,400,435 B2 | 7/2008 | Byers et al. |
| 7,626,749 B2 | 12/2009 | Baur et al. |
| 7,855,755 B2 | 12/2010 | Weller et al. |
| 8,058,977 B2 | 11/2011 | Lynam |
| 8,503,061 B2 | 8/2013 | Uken et al. |
| 9,233,641 B2 | 1/2016 | Sesti et al. |
| 9,487,144 B2 | 11/2016 | Blank et al. |
| 9,878,669 B2 | 1/2018 | Kendall |
| 10,466,563 B2 | 11/2019 | Kendall et al. |
| 2006/0061008 A1 | 3/2006 | Karner et al. |
| 2010/0085653 A1 | 4/2010 | Uken et al. |
| 2012/0229882 A1 | 9/2012 | Fish, Jr. et al. |
| 2013/0088884 A1 | 4/2013 | Brummel et al. |
| 2016/0268716 A1 | 9/2016 | Conger et al. |
| 2017/0162965 A1 | 6/2017 | Hallack et al. |
| 2018/0147991 A1 | 5/2018 | Kendall |

MIRROR ASSEMBLY WITH SPRING-LOADED ELECTRICAL CONNECTORS

CROSS REFERENCE TO RELATED APPLICATIONS

The present application is a continuation of U.S. patent application Ser. No. 15/478,273, filed Apr. 4, 2017, now U.S. Pat. No. 10,466,563, which claims priority of U.S. provisional application Ser. No. 62/319,012, filed Apr. 6, 2016, which is hereby incorporated herein by reference in its entirety. U.S. patent application Ser. No. 15/478,273 is also a continuation-in-part of U.S. patent application Ser. No. 15/051,824, filed Feb. 24, 2016, now U.S. Pat. No. 9,878,669, which claims the filing benefits of U.S. provisional applications, Ser. No. 62/198,881, filed Jul. 30, 2015, Ser. No. 62/169,705, filed Jun. 2, 2015, and Ser. No. 62/120,039, filed Feb. 24, 2015, which are hereby incorporated herein by reference in their entireties.

FIELD OF THE INVENTION

The present invention relates generally to the field of rearview mirror assemblies for vehicles and, more particularly, to exterior rearview mirror assemblies having a variable reflectance reflective element and circuitry for electrically connecting to the electrically conductive coatings of the variable reflectance reflective element.

BACKGROUND OF THE INVENTION

It is known to provide a mirror assembly at an exterior portion of a vehicle. The reflective element may be an electrochromic reflective element having an electrochromic medium sandwiched between front and rear substrates coated with electrically conductive coatings, whereby, when powered, the transmissivity of the reflective element is varied. Typically, electrical connection to the conductive coatings is provided via soldering to clips that clip onto an edge portion of the respective substrate.

SUMMARY OF THE INVENTION

The present invention provides a rearview mirror assembly that provides spring-loaded electrical connectors that electrically connect between electrically conductive connecting elements, such as wires or the like, and electrically conductive elements established at the rear of the reflective element (such as at the fourth or rear surface of an electro-optic mirror reflective element). The electrically conductive elements at the rear surface of the reflective element may comprise electrically conductive traces that are electrically conductively connected to electrically powered elements at the reflective element, such as the electrically conductive coatings at the second and third surfaces of an electro-optic mirror reflective element. The spring-loaded electrical connectors are urged or biased into electrical contact with the electrically conductive elements as the back plate is attached at the rear of the reflective element and/or as a circuit board or element is attached at the back plate. The electrically conductive connecting elements or wires or leads electrically connect the spring-loaded electrical connectors to an electrical connector (such as a plug or socket type connector) at the rear of the reflective element or back plate attached at the reflective element, which is configured to electrically connect to a corresponding socket or plug type connector of a wire harness of the mirror assembly and/or vehicle.

These and other objects, advantages, purposes and features of the present invention will become apparent upon review of the following specification in conjunction with the drawings.

DESCRIPTION OF THE PREFERRED EMBODIMENTS

Figure 1:
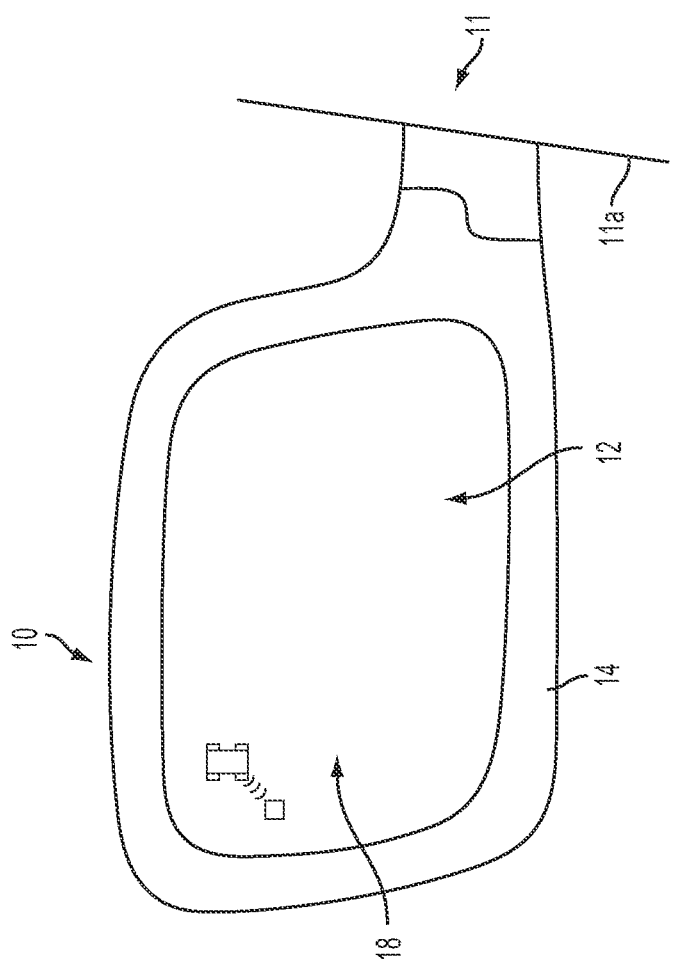
FIG. 1 is a plan view of an exterior rearview mirror assembly in accordance with the present invention.

Referring now to the drawings and the illustrative embodiments depicted therein, an exterior rearview mirror assembly 10 for a vehicle includes a casing 12 and a reflective element 14 positioned at a front portion of the casing 12 (FIG. 1). In the illustrated embodiment, mirror assembly 10 is configured to be mounted at an exterior portion 11a of a vehicle 11 via a mounting structure, such as a pivotal or foldable structure or breakaway structure or the like. The mirror assembly 10 may include a blind spot alert or icon 18 that is illuminated so as to be viewable at or through the reflective element 14 by a driver of the vehicle. The mirror reflective element comprises a variable reflectance mirror reflective element that varies its reflectance responsive to electrical current applied to conductive coatings or layers of the reflective element. The reflective element 14 is attached at a back plate 30 (FIG. 2) and includes a pair of spring-loaded or biased connectors 32 that are disposed at and attached at the back plate 30 (such as at a perimeter region of the back plate 30) and that are biased or urged into engagement with and electrical contact with respective connecting elements 34a, 34b at the rear perimeter region of the reflective element 14 to electrically connect to the respective electrically conductive coatings of the reflective element, as discussed below. The connectors 32 are electrically connected to respective wires or leads 36 from an electrical connector 38 (such as a plug or socket connector) that is attached at the back plate and configured to electrically connect to a corresponding connector of the mirror assembly and/or vehicle when the reflective element is disposed at the mirror casing and/or when the mirror assembly is mounted at the vehicle.

Figure 2:
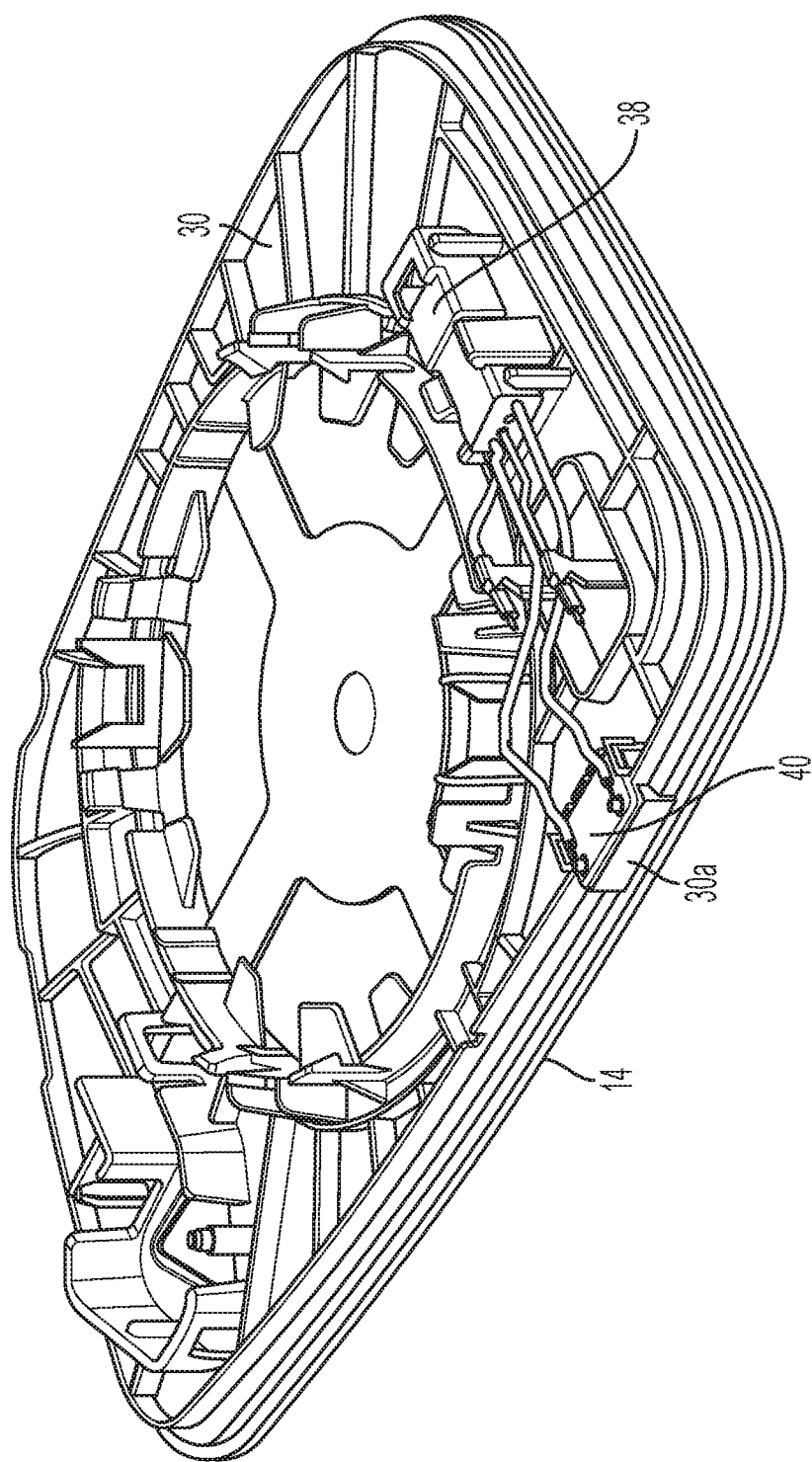
FIG. 2 is a perspective view of a mirror reflective element assembly, having electrical connecting elements in accordance with the present invention.

In the illustrated embodiment, and as shown in FIG. 2, the mirror reflective element 14 comprises a laminate construction variable reflectance electro-optic (such as electrochromic) reflective element assembly having a front substrate and a rear substrate with an electro-optic medium (such as electrochromic medium) sandwiched therebetween and bounded by a perimeter seal. The front substrate has a front or first surface (the surface that generally faces the driver of a vehicle when the mirror assembly is normally mounted at the vehicle) and a rear or second surface opposite the front surface, and the rear substrate has a front or third surface and a rear or fourth surface opposite the front surface, with the electro-optic medium disposed between the second surface and the third surface and bounded by the perimeter seal of the reflective element (such as is known in the electrochromic mirror art). The second surface has a transparent conductive coating established thereat (such as an indium tin oxide (ITO) layer, or a doped tin oxide layer or any other transparent electrically semi-conductive layer or coating or the like (such as indium cerium oxide (ICO), indium tungsten oxide (IWO), or indium oxide (IO) layers or the like or a zinc oxide layer or coating, or a zinc oxide coating or the like doped with aluminum or other metallic materials, such as silver or gold or the like, or other oxides doped with a suitable metallic material or the like, or such as disclosed in U.S. Pat. No. 7,274,501, which is hereby incorporated herein by reference in its entirety), while the third surface has a metallic reflector coating (or multiple layers or coatings) established thereat. The front or third surface of the rear substrate may include one or more transparent semi-conductive layers (such as an ITO layer or the like), and one or more metallic electrically conductive layers (such as a layer of silver, aluminum, chromium or the like or an alloy thereof), and may include multiple layers such as disclosed in U.S. Pat. Nos. 7,274,501; 7,184,190 and/or 7,255,451, which are hereby incorporated herein by reference in their entireties. The mirror reflector may comprise any suitable coatings or layers, such as a transflective coating or layer, such as described in U.S. Pat. Nos. 7,626,749; 7,274,501; 7,255,451; 7,195,381; 7,184,190; 6,690,268; 5,140,455; 5,151,816; 6,178,034; 6,154,306; 6,002,511; 5,567,360; 5,525,264; 5,610,756; 5,406,414; 5,253,109; 5,076,673; 5,073,012; 5,115,346; 5,724,187; 5,668,663; 5,910,854; 5,142,407 and/or 4,712,879, which are hereby incorporated herein by reference in their entireties, disposed at the front surface of the rear substrate (commonly referred to as the third surface of the reflective element) and opposing the electro-optic medium, such as an electrochromic medium disposed between the front and rear substrates and bounded by the perimeter seal (but optionally, the mirror reflector could be disposed at the rear surface of the rear substrate (commonly referred to as the fourth surface of the reflective element), while remaining within the spirit and scope of the present invention).

The third surface defines the active EC area or surface of the rear substrate within the perimeter seal. The coated third surface may also be coated to define a tab-out region and wrap around coating or portion (such as by utilizing aspects of the mirror assemblies described in U.S. Pat. Nos. 7,274,501; 7,184,190 and/or 7,255,451, which are hereby incorporated herein by reference in their entireties) that wraps around the perimeter edge of the rear substrate and overcoats a portion of the rear or fourth surface of the rear substrate. The wrap around portion thus provides electrical connection of the conductive layers to an electrically conductive pad or bus-bar or element 34a established or disposed at the rear surface of the rear substrate for electrical connection to a spring-loaded connector 32. Optionally, the conductive pad 34a may comprise a conductive metal pad or element or tab that is adhered or otherwise established at the fourth surface and that is electrically conductively connected to the third surface coating via a conductive epoxy or the like.

Likewise, an electrically conductive pad or bus-bar or element 34b (which may be a coating established at the rear surface of the rear substrate or may be a metal pad or electrically conductive element adhered or otherwise attached or bonded or established or disposed at the rear surface of the rear substrate) may be established at another region of the rear surface of the rear substrate for electrical connection to another spring-loaded connector 32. The conductive pad 34b may be electrically connected to the electrically conductive transparent coating at the rear or second surface of the front substrate, such as via a conductive epoxy or the like established along a portion of a perimeter region of the reflective element (and at a region where the perimeter seal may electrically isolate the coating at the rear surface of the rear substrate from the conductive epoxy). The reflective elements and conductive pads may utilize aspects of the reflective elements described in U.S. Publication No. US-2016-0243987, which is hereby incorporated herein by reference in its entirety.

The pads 34a, 34b may be disposed at or established at the fourth or rear surface of the reflective element or optionally may be disposed at or established at the rear surface of the front substrate at an overhang region where the perimeter edge region of the front substrate extends beyond the perimeter edge of the rear substrate. In such an application, the pad 34b may electrically connect to a portion of the transparent conductive coating at the second surface of the front substrate, while the pad 34a may be disposed at the overhang region or at the second surface of the front substrate and electrically connect (such as via a conductive potting material or epoxy or the like) to the conductive coating at the third surface. Optionally, the pad 34a may be disposed at or established at the fourth or rear surface of the reflective element (and may electrically connect to the third surface conductive coating via a wrap-around conductive layer or the like), while the pad 34b may be disposed at or established at the second surface of the reflective element.

Figure 3:
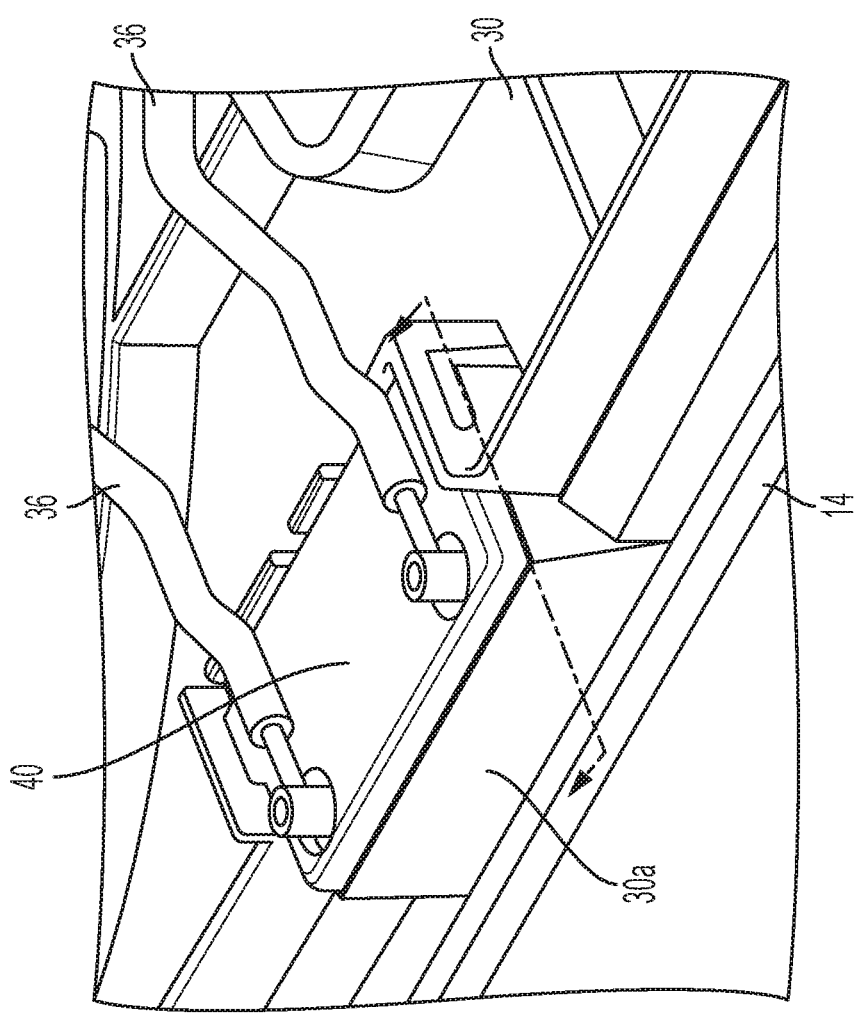
FIG. 3 is an enlarged perspective view of the electrical connecting elements of the mirror reflective element assembly of FIG. 2.
Figure 4:
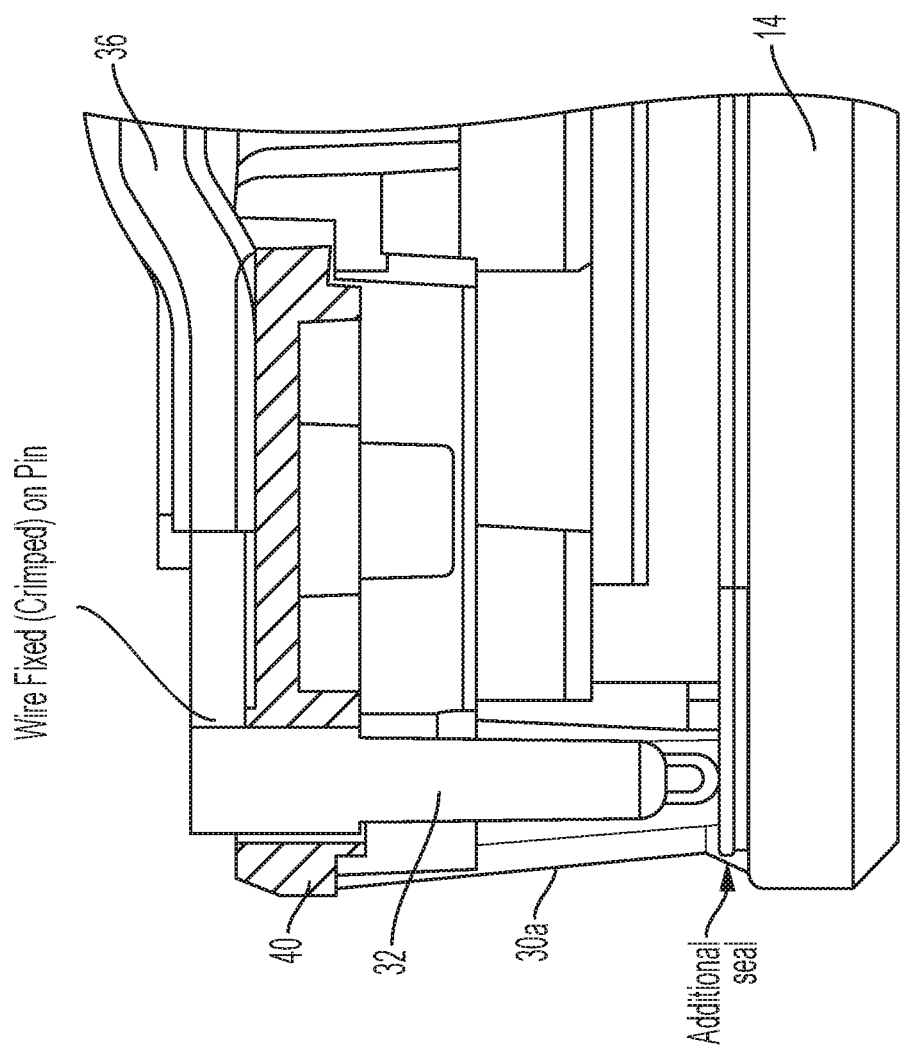
FIG. 4 is a sectional view of the area shown in FIG. 3.

As can be seen with reference to FIGS. 3 and 4, the back plate 30 attaches at the reflective element 14, with the electrically conductive pads 34a, 34b exposed at the rear surface of the reflective element. The back plate 30 includes an attachment portion 30a for receiving or attaching a connector holder or cover 40 (FIGS. 3 and 4), which holds the connecting elements 32 thereat, such that the connecting elements 32 are aligned or positioned at and biased towards connection to the respective conductive pads 34a, 34b at the fourth surface of the mirror reflective element. The cover element 40 may hold the pins or connecting elements 32 and the wires 36 may electrically connect to the pins 32 at the outer surface of the cover 40, as shown in FIGS. 3 and 4). The cover element may snap attach to the attachment portion 30a of the back plate to position and hold the pins 32 at the attachment portion 30a and at the respective conductive pads 34a, 34b, with the springs biased toward an extended state so that the pins are biased toward and urged into contact with the respective conductive pads 34a, 34b. The cover may be overmolded at the outer ends of the pins or the pins may be press-fit into the attachment portion to be retained thereat.

Figure 5:
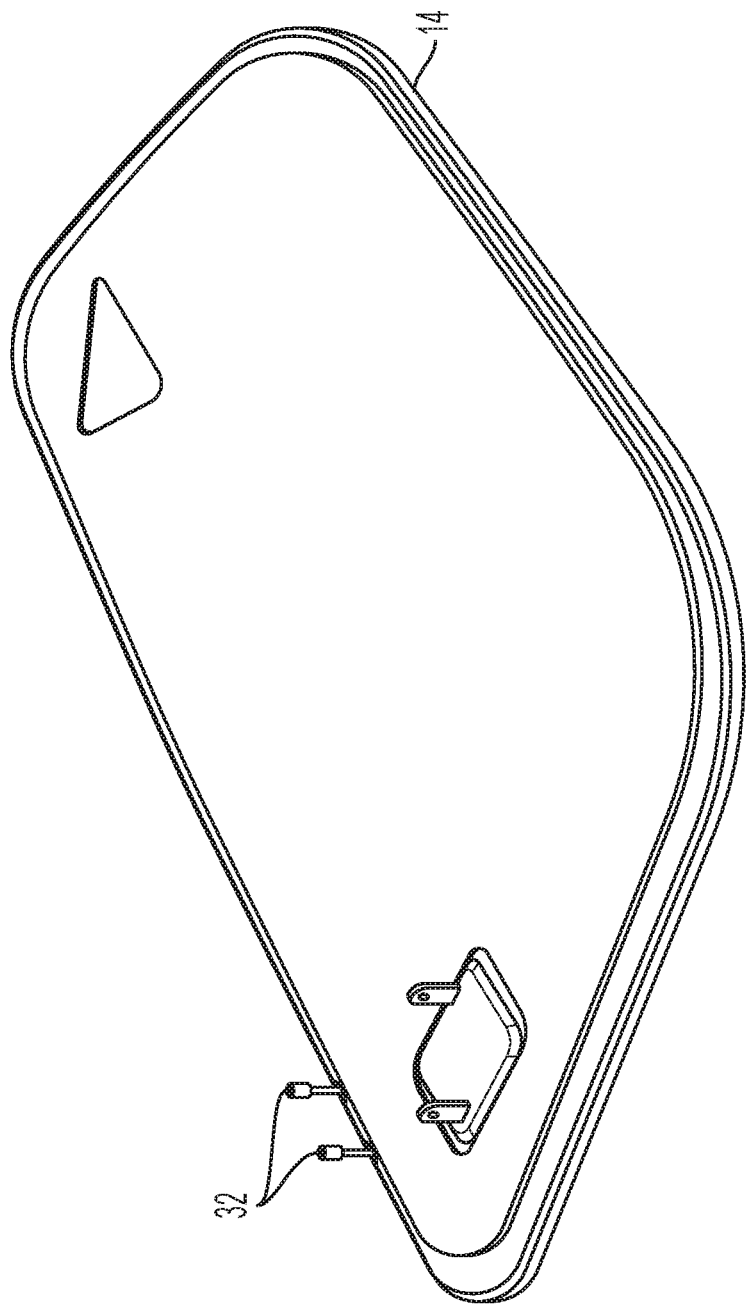
FIG. 5 is a perspective view of the mirror reflective element, shown with the back plate removed to show the electrical connecting elements in accordance with the present invention.
Figure 6:
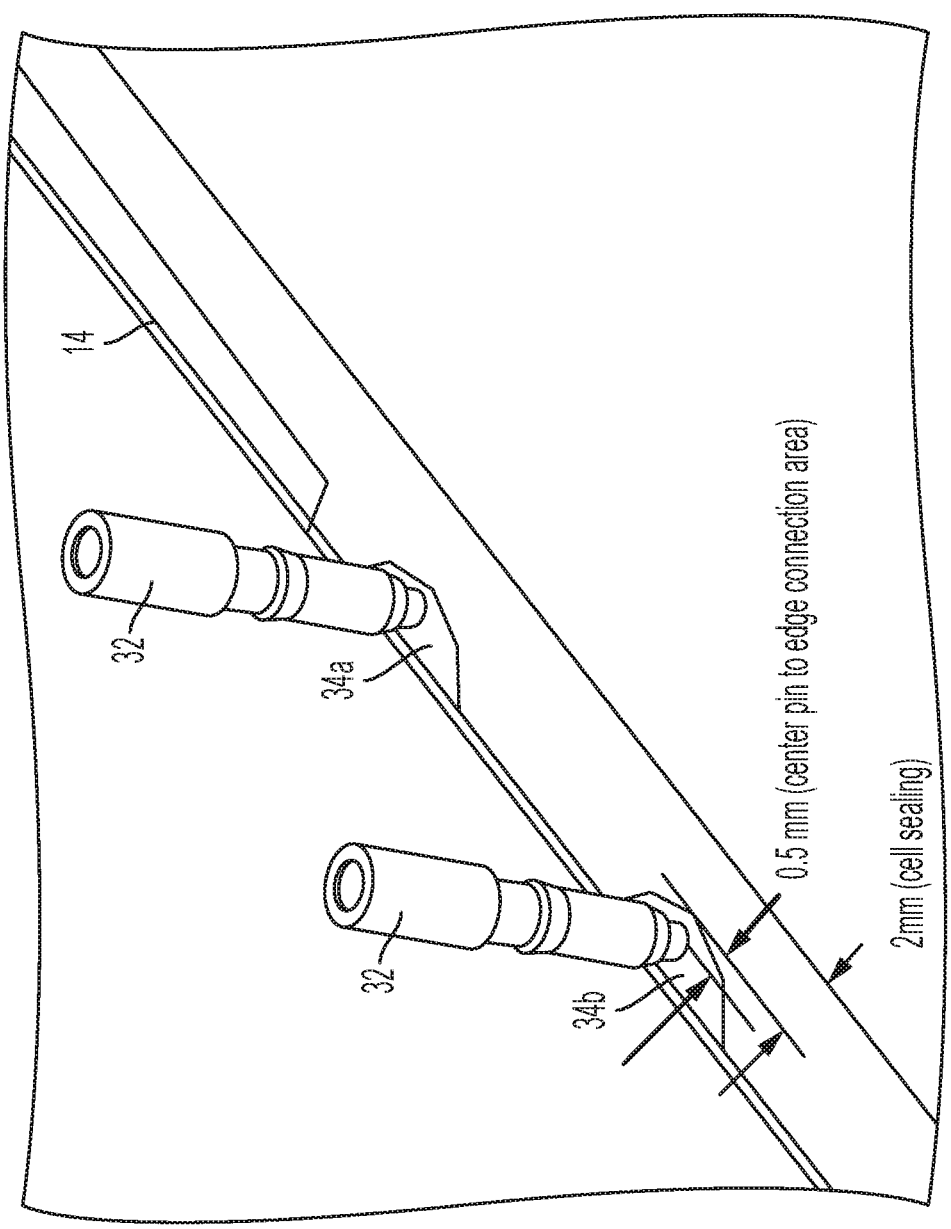
FIG. 6 is an enlarged perspective view of the electrical connecting elements of the mirror reflective element assembly of FIG. 5.

As shown in FIG. 4, the back plate attachment portion 30a is sealed at the interface of the rear surface of the reflective element. And as can be seen in FIGS. 5 and 6 (showing the pins and pads without the attachment portion and cover), the pins 32 are disposed at respective pads 34a, 34b that are spaced apart and electrically isolated from one another. Thus, the pins and pads are electrically isolated from one another and sealed to limit or preclude water intrusion and to maintain electrical isolation between the pins and pads and thus between the electrically conductive coatings at the opposing surfaces of the front and rear substrates.

Thus, when the electrical connecting elements 32 and the cover 40 are disposed at the attachment portion 30a of the back plate 30, the spring-loaded connecting elements 32 are moved into engagement with the conductive pads 34a, 34b to electrically connect the wires to the electrically conductive coatings of the reflective element so as to power the electro-optic mirror reflective element or cell. The connecting elements 32 have a length dimension (when not compressed) that is larger than the distance between the cover element and the conductive pads and the connecting elements are biased or urged toward their extended state, such that the contacts or ends of the connecting elements 32 may protrude towards and into contact with the conducting pads when the cover is attached at the attachment portion of the back plate. As the cover is pressed into place at the attachment portion 30a, the spring-loaded connecting elements or pins 32 compress and the metallic or electrically conductive contact end is movable relative to the connector body and contact end of the pin to compress the connector, and is biased towards its extended state via an internal spring (such as by utilizing aspects of the spring-loaded pins described in U.S. Publication No. US-2016-0243987, which is hereby incorporated herein by reference in its entirety).

The wires 36 electrically connect between the pins 32 and the connector 38, and the connector 38 may also connect to wires of another accessory of the mirror reflective element assembly, such as to a heater pad or to a blind zone indicator or turn signal indicator or the like. The wires 36 may be routed along the rear of the back plate 30 to the connector 38, which may comprise a multi-pin connector (such as a plug or socket connector) that is attached or retained at attaching elements or clips or the like at the rear of the back plate 30. Thus, the connector and pins and cover and wires may be provided as a unit that is snap-attached at the rear of the back plate, with the cover 40 snap-attaching to the attachment portion 30a to electrically connect the pins to the conductive pads and the connector 38 snap-attaching at the clips at the rear of the back plate 30.

Figure 7:
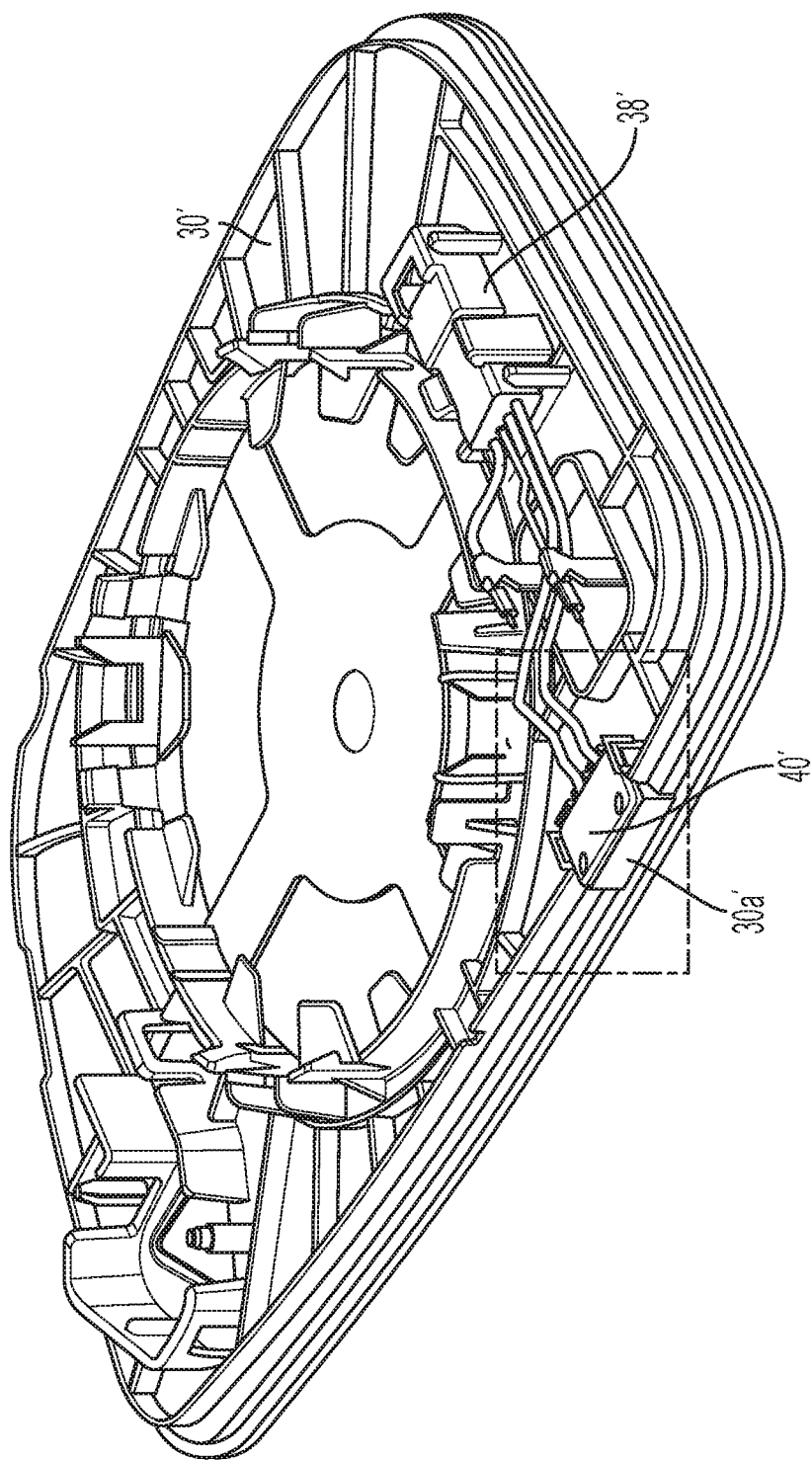
FIG. 7 is a perspective view of another mirror reflective element assembly, having electrical connecting elements in accordance with the present invention.
Figure 8:
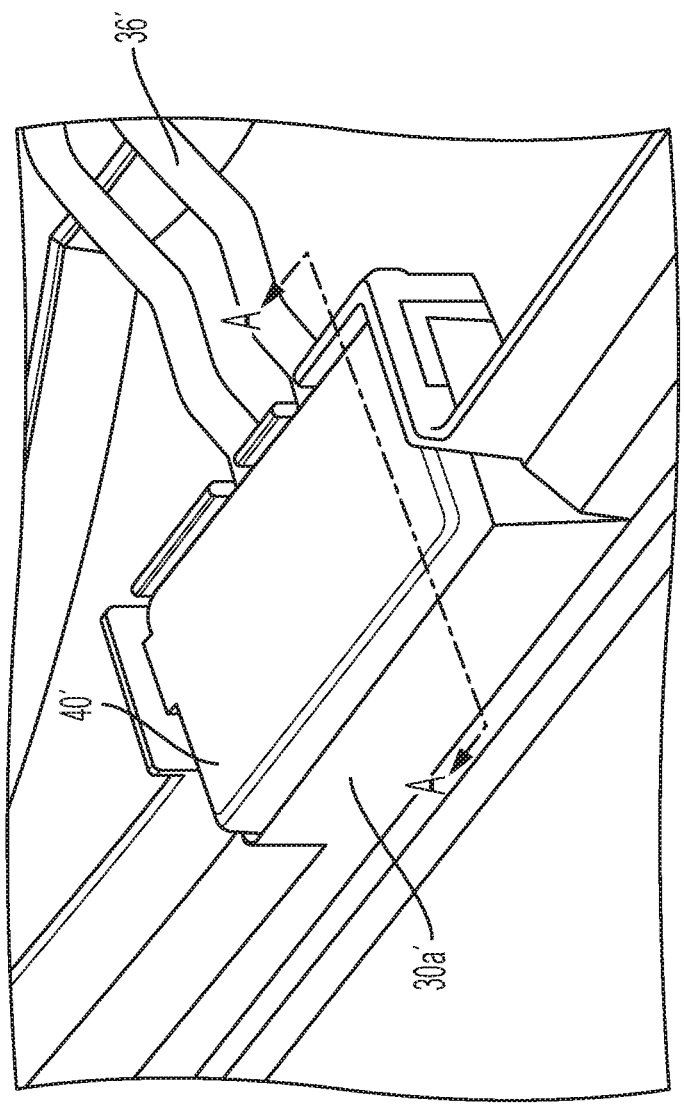
FIG. 8 is an enlarged perspective view of the electrical connecting elements of the mirror reflective element assembly of FIG. 7.
Figure 9:
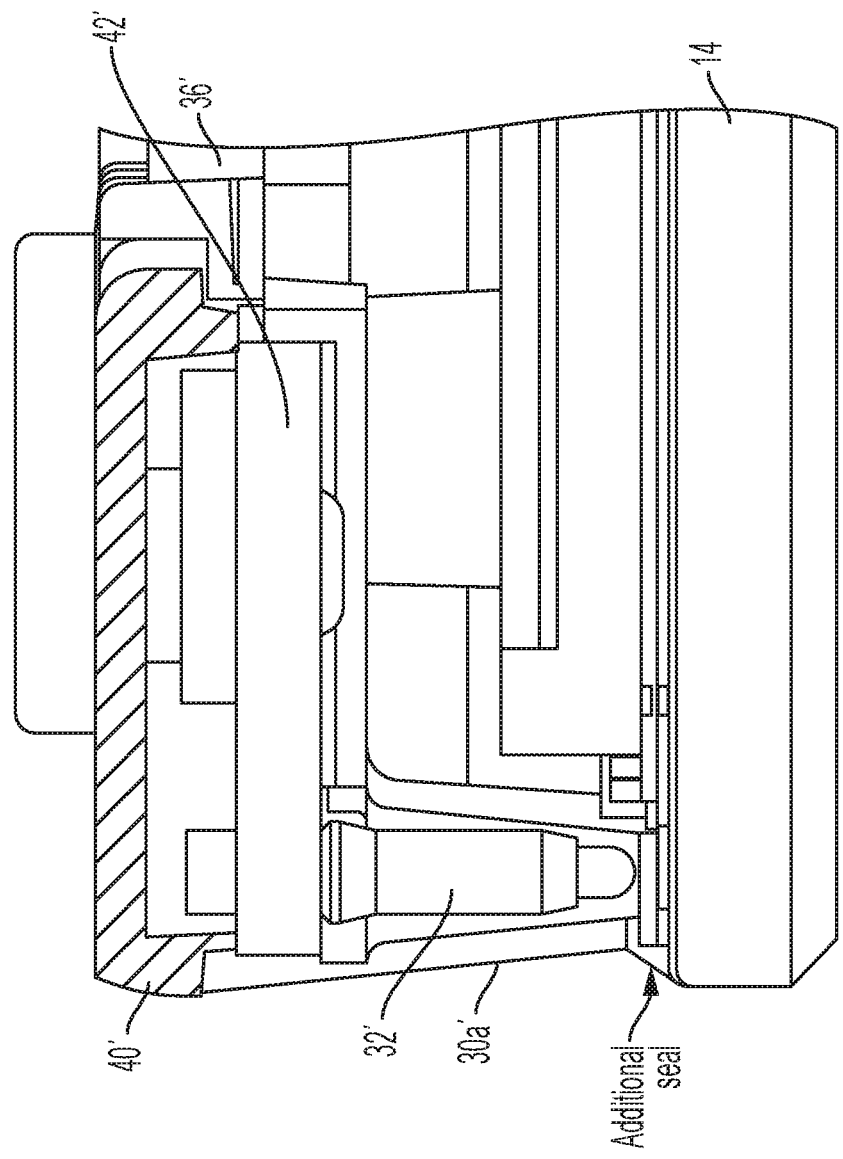
FIG. 9 is a sectional view of the area shown in FIG. 8.

Although shown and described as having the pins 32 protrude through the cover element, a cover element 40' (FIGS. 7-9) may cover or enclose the pins within the attachment portion 30a' of the back plate 30'. As shown in FIG. 9, a circuit element or board 42' (such as a printed circuit board or PCB) may be disposed at the attachment portion 30a' with the pins or connecting elements 32' disposed at and electrically connected at conductive traces of the PCB 42'. In such an application, the wires 36' may be electrically connected to circuitry or traces of the PCB (such as via soldering or the like) to electrically connect with the pins 32', with all of the electrical connections at the PCB 42' being encased within the cover 40' and the attachment portion 30a'.

The circuit element or PCB 44' may be configured to snap attach at the back plate at or in the attachment portion 30a'. When the PCB is attached at the back plate, the pins 32' are urged into engagement with the conductive pads at the rear surface of the rear substrate of the reflective element 14' (similar to pins 32 discussed above), whereby the pins compress as they are sandwiched between the circuit board and the reflective element to establish electrical connection at the conductive pads at the rear of the reflective element, with the compressed spring biasing the contact ends towards the rear surface of the reflective element to maintain the electrical connection. The pins and electrical connections (including the wires 36' and the connector 38') may otherwise be substantially similar to pins 32, discussed above, such that a detailed discussion of the reflective element and back plate assemblies need not be repeated herein.

Thus, the spring-loaded electrical connector of the present invention may be formed of a first, generally tubular, metallic stamping or form or body portion having a first cross-sectional dimension, and a second, generally tubular, metallic stamping or form or body portion having a second cross-sectional dimension. The shape, form and cross-sectional dimension of the second body portion is smaller than that of the first body portion, such that the second body portion is disposed within the first body portion and is slidable along and within the first body portion. A spring or other biasing element is disposed within at least the first body portion and enables the second body portion to move within and along the inner walls of the first body portion. The spring element urges the second body portion outward from the first body portion to extend the connector to its extended state (where the length of the connector is greater than the thickness of the back plate in and through which it is disposed), with the spring element compressing to allow the connector to compress as the cover element or PCB is attached at the back plate and/or as the back plate is attached at the rear surface of the reflective element.

By providing the pins as part of the cover element and/or as part of the PCB, the pins can be readily attached at the reflective element after the back plate has been attached at the rear of the rear substrate (or can be readily attached at the back plate before the back plate is attached at the rear of the rear substrate. The pins are held in place by the PCB or the cover element and thus the components can be readily snapped or otherwise attached at the back plate to establish electrical connection to the conductive pads or traces at the rear surface of the reflective element. The spring-loaded electrical connector of the present invention thus provides enhanced assembly and electrical connection of mirror reflective element sub-assemblies.

Optionally, the PCB or cover element (with the spring-loaded electrical connectors disposed thereat) may be part of an electrical connector that is disposed at the rear of the back plate and includes the wires 36 and plastic connector element 38, whereby the electrical connector is readily attached at the rear of the back plate before or after the back plate is attached at the reflective element. When the electrical connector (including the attaching element or PCB or cover and the spring-loaded pins and the wires and connector portion) is attached at the back plate, the spring-loaded pins are aligned with and urged or biased toward electrical connection with the conductive pads or busbars established at the rear surface of the reflective element. As shown in FIG. 2, the connector portion or element 38 may snap attach at the back plate 30 and the cover element 40 may also snap attach at the attachment portion 30a of the back plate 30 to provide electrical connection to the conductive coatings of the reflective element when the connector portion or element is further electrically connected to a connector end of a wire harness of the mirror assembly or vehicle. The connector assembly may also include wires or leads or elements for electrically connecting to a heater pad or other accessory of the vehicle via electrical connection of the connector portion and the vehicle or mirror wire harness. The connector assembly (comprising the cover element 40, the pins 32, the wires 36 and the connector element 38 of FIG. 2 or comprising the PCB 42', the pins 32', the wires 36' and the connector element 38' of FIG. 7) thus may be provided as a separate component that may be snap attached at the back plate before or after the back plate is attached at the reflective element.

Thus, the present invention provides spring-loaded electrical connectors that establish electrical connection between circuitry or wires at a PCB or cover element and electrical contacts at the rear of the reflective element during assembly of the PCB or cover element at the back plate. The present invention thus reduces or eliminates wiring connectors and soldering of connectors at the reflective element. The spring force of the internal spring of the connector may be selected to be sufficient to establish and maintain electrical connection during and after assembly. For example, the spring force may be at least about 1 N, preferably at least about 1.5 N or thereabouts. The connector contact ends and body comprise a metallic or otherwise electrically conductive material and the spring also comprises a metallic or otherwise electrically conductive material such that electrical current can pass from one contact end to the other when one of the ends is electrically powered (and when the other end is electrically connected to circuitry to power).

In the illustrated embodiment, two electrical connectors are provided to establish electrical connection between EC control circuitry to the electrically conductive coatings at the second and third surfaces of the reflective element. However, spring-loaded electrical connectors may also or otherwise provide electrical connection between circuitry and contacts for other electrically powered or controlled elements, such as sensors or heater pads (for exterior mirror applications) or the like, while remaining within the spirit and scope of the present invention.

For example, one or more spring-loaded electrical connectors may be disposed in the back plate of an exterior rearview mirror assembly and configured to electrically connect with conductive pads or elements of a heater pad disposed at the rear of the mirror reflective element (and between a generally planar portion of the back plate and the mirror reflective element). The heater pad spring-loaded electrical connectors electrically connect to circuitry at the circuit board (such as when the circuit board is attached or snap-attached at the back plate) and provide power and/or control to the heater pad to control heating of the mirror reflective element of the exterior rearview mirror assembly. Optionally, other spring-loaded electrical connectors may be provided at and through the back plate for electrically connecting circuitry of the circuit board to other electrically powered elements or devices, such as one or more light sources or indicators disposed at the rear of the mirror reflective element (and viewable through the reflective element when powered). Thus, multiple spring-loaded electrical connectors of the present invention may be provided at and through the back plate to provide the desired electrical power and control of one or more electrically powered devices or element.

The present invention thus provides spring-loaded electrical connectors that electrically connect between the PCB and conductive coatings or pads at the rear of an electro-optic reflective element, with the connectors being snapped into the attachment plate or back plate with the ends protruding from one or both sides of the back plate. The pins or connectors are thus part of or retained at the back plate and are positioned at the rear of the reflective element when the reflective element is attached at or received in the back plate. The present invention thus provides enhanced assembly of the mirror reflective element assembly, particularly for frameless type mirror reflective elements that may not have an overlap or offset region of the substrates for a clip attachment. The conductive pads are established at the rear surface of the rear substrate and the spring-loaded or biased pins or connectors are disposed at the back plate and make connection between the conductive pads and circuitry or traces at a PCB or to wires that electrically connect to a mirror connector. The pins are then held in place by the attachment of the PCB or cover element and maintain the electrical connection to the conductive coatings of the reflective element. Such a configuration eases the assembly of the mirror and facilitates automated assembly and connections.

Optionally, the spring-loaded electrical connectors may be insert molded in attachment portion of the back plate (such as during an injection molding process that forms the plastic back plate), with the ends of the connector protruding at either side of the back plate. Optionally, the spring-loaded connector may be disposed in a plastic (non-electrically conductive) sleeve and may be longitudinally movable along a passageway of the sleeve (so as to generally float in the passageway of the sleeve), with one or more flanges of the connector and the sleeve interacting to limit longitudinal movement of the connector within and relative to the sleeve. The sleeves (with the respective spring-loaded connectors disposed therein) may be disposed in the mold for the back plate such that, when the back plate is molded (via an injection molding process), the sleeves are integral to the back plate and held in place by the molded back plate that is molded around the sleeves (which may have one or more exterior protrusions that are molded over by the back plate to further secure the sleeves relative to the molded back plate).

The present invention thus provides flexible or spring-biased or spring-loaded electrical connectors that electrically connect to conductive coatings or pads at the rear of an electro-optic reflective element. The connectors may be part of a circuit board or part of the back plate or part of a cover element that attaches at the back plate and are positioned at the rear of the reflective element when the reflective element is attached at the back plate. Thus, when the reflective element is attached at the back plate, that end of the connector may engage or may be pressed into engagement with the pads at the fourth surface. The present invention thus provides enhanced assembly of the mirror reflective element assembly, particularly for frameless type mirror reflective elements that may not have an overlap or offset region of the substrates for a clip attachment. The connectors are held in place by the attachment of the PCB or cover element and maintain the electrical connection of the circuitry to the conductive coatings of the reflective element. Such a configuration eases the assembly of the mirror and facilitates automated assembly and connections.

The back plate may comprise any suitable construction. Optionally, for example, a common or universal back plate, whereby the appropriate or selected socket element or pivot element (such as a socket element or such as a ball element or the like) is attached to the back plate to provide the desired pivot joint for the particular mirror head in which the back plate is incorporated.

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529,108, or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Des. Pat. Nos. D633,423; D633,019; D638,761 and/or D647,017, and/or International Publication Nos. WO 2010/124064; WO 2011/044312; WO 2012/051500; WO 2013/071070 and/or WO 2013/126719, which are hereby incorporated herein by reference in their entireties (and with electrochromic and prismatic mirrors of such construction are commercially available from the assignee of this application under the trade name INFINITY™ mirror).

As discussed above, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties.

Electro-optic mirror assemblies suitable for use with the present invention include liquid crystal mirrors having electrically variable reflectance, such as those described in U.S. Publication Nos. US-2016-0023606; US-2016-0009226; US-2015-0283945 and/or US-2011-0273659, which are hereby incorporated herein by reference in their entireties.

Optionally, it is envisioned that aspects of the mirror assemblies of the present invention may be suitable for a rearview mirror assembly that comprises a non-electro-optic mirror assembly (such as a generally planar or optionally slightly curved mirror substrate) or an electro-optic or electrochromic mirror assembly. Optionally, the rearview mirror assembly may comprise a mirror assembly of the types described in U.S. Pat. Nos. 7,420,756; 7,289,037; 7,274,501; 7,338,177; 7,255,451; 7,249,860; 6,318,870; 6,598,980; 5,327,288; 4,948,242; 4,826,289; 4,436,371 and/or 4,435,042, which are hereby incorporated herein by reference in their entireties. A variety of mirror accessories and constructions are known in the art, such as those disclosed in U.S. Pat. Nos. 5,555,136; 5,582,383; 5,680,263; 5,984,482; 6,227,675; 6,229,319 and/or 6,315,421 (which are hereby incorporated herein by reference in their entireties), that can benefit from the present invention.

Optionally, an exterior rearview mirror assembly of the present invention may include a spotter mirror element to provide a wide angle rearward field of view to the driver of the vehicle equipped with the mirror assembly. The spotter mirror element may utilize aspects of the mirrors described in U.S. Pat. Nos. 7,255,451; 7,195,381; 6,717,712; 7,126,456; 6,315,419; 7,097,312; 6,522,451; 6,315,419; 5,080,492; 5,050,977; 5,033,835; 8,021,005; 7,934,844; 7,887,204; 7,824,045 and/or 7,748,856, which are hereby incorporated herein by reference in their entireties.

Optionally, the exterior mirror element of a mirror assembly may include heater pad or film or element at a rear surface of the mirror reflective element. The heater pad or element at the rear surface of the glass substrate may comprise a mirror defrost/demisting heater and may provide an anti-fogging of de-fogging feature to the exterior mirror assembly, and may utilize aspects of the heater elements or pads described in U.S. Pat. Nos. 8,058,977; 7,400,435; 5,808,777; 5,610,756 and/or 5,446,576, and/or U.S. Publication Nos. US-2008-0011733 and/or US-2011-0286096, which are hereby incorporated herein by reference in their entireties. The heater element may include electrical contacts that extend rearward therefrom and through an aperture of attaching portion of back plate for electrical connection to a wire harness or connector of the mirror assembly, or the back plate and/or heater pad may include suitable electrical connectors and connections incorporated therein (such as by utilizing aspects of the mirror assembly described in U.S. Pat. No. 7,400,435, which is hereby incorporated herein by reference in its entirety) for electrically connecting the heater pad (or other suitable electrical connectors may be utilized, such as electrical leads or wire harnesses or pigtails or other separate connectors or cables or the like). Optionally, the heater pad may comprise a screen printed heater pad. For example, the heater pad can be printed on the back of the mirror reflective element (such as at the fourth or rear surface of the rear substrate). Such coatings may be printed and then cured at around 120 degrees C. or lower, making this process compatible with already formed laminate type EC mirror elements, such as those described in U.S. Pat. No. 5,724,187, which is hereby incorporated herein by reference in its entirety. This would make it compatible with EC mirrors.

Optionally, the mirror assembly may include a blind spot indicator and/or a turn signal indicator, such as an indicator or indicators of the types described in U.S. Pat. Nos. 6,198,409; 5,929,786 and/or 5,786,772, and/or International Publication Nos. WO 2007/005942 and/or WO 2008/051910, which are hereby incorporated herein by reference in their entireties. The signal indicator or indication module may include or utilize aspects of various light modules or systems or devices, such as the types described in U.S. Pat. Nos. 7,581,859; 6,227,689; 6,582,109; 5,371,659; 5,497,306; 5,669,699; 5,823,654; 6,176,602 and/or 6,276,821, and/or International Publication No. WO 2006/124682, which are hereby incorporated herein by reference in their entireties.

Such an indicator or indicators may function as a lane change assist (LCA) indicator or indicators and/or a blind spot indicator or indicators. Such blind spot indicators are typically activated when an object is detected (via a side object or blind spot detection system or the like such as described in U.S. Pat. Nos. 7,038,577; 6,882,287; 6,198,409; 5,929,786; 5,786,772 and/or 7,720,580, and/or International Publication No. WO 2007/005942, which are hereby incorporated herein by reference in their entireties) at the side and/or rear of the vehicle (at the blind spot) and when the turn signal is also activated, so as to provide an alert to the driver of the host vehicle that there is an object or vehicle in the lane next to the host vehicle at a time when the driver of the host vehicle intends to move over into the adjacent lane. Optionally, and alternately, the indicator or indicators may function as a lane change assist indicator or indicators, where the host vehicle may be detected to be moving into an adjacent lane without the turn signal being activated, and an object or vehicle may be detected at the adjacent lane, whereby the LCA indicator or indicators may be activated to provide an alert to the driver of the lane change to assist the driver in avoiding unintentional lane changes and/or lane changes when a vehicle or object is detected in the adjacent lane.

The blind spot indicators thus may be operable to provide an indication to the driver of the host vehicle that an object or other vehicle has been detected in the lane or area adjacent to the side of the host vehicle. The blind spot indicator may be operable in association with a blind spot detection system, which may include an imaging sensor or sensors, or an ultrasonic sensor or sensors, or a sonar sensor or sensors or the like. For example, the blind spot detection system may utilize aspects of the blind spot detection and/or imaging systems described in U.S. Pat. Nos. 7,038,577; 6,882,287; 6,198,409; 5,929,786; 5,786,772; 7,881,496 and/or 7,720,580, and/or of the reverse or backup aid systems, such as the rearwardly directed vehicle vision systems described in U.S. Pat. Nos. 5,550,677; 5,760,962; 5,670,935; 6,201,642; 6,396,397; 6,498,620; 6,717,610 6,757,109 and/or 7,005,974, and/or of the automatic headlamp controls described in U.S. Pat. Nos. 5,796,094; 5,715,093 and/or 7,526,103, and/or of the rain sensors described in U.S. Pat. Nos. 6,250,148 and 6,341,523, and/or of other imaging systems, such as the types described in U.S. Pat. Nos. 6,353,392 and 6,313,454, which may utilize various imaging sensors or imaging array sensors or cameras or the like, such as a CMOS imaging array sensor, a CCD sensor or other sensors or the like, such as the types disclosed in commonly assigned, U.S. Pat. Nos. 5,550,677; 5,760,962; 6,097,023 and/or 5,796,094, and/or International Publication No. WO 2004/047421, with all of the above referenced U.S. patents, patent applications and provisional applications and PCT applications being commonly assigned and being hereby incorporated herein by reference in their entireties.

The reflective element of the rearview mirror assembly of vehicles may include an auxiliary wide angle or spotter mirror portion, such as the types described in U.S. Pat. Nos. 7,255,451; 7,195,381; 6,717,712; 7,126,456; 6,315,419; 7,097,312; 6,522,451; 6,315,419; 5,080,492; 5,050,977 and/or 5,033,835, which are hereby incorporated herein by reference in their entireties, and optionally may have an integrally formed auxiliary mirror reflector, such as the types described in U.S. Pat. Nos. 8,736,940; 8,021,005; 7,934,844; 7,887,204; 7,824,045 and 7,748,856, which are hereby incorporated herein by reference in their entireties. The auxiliary wide angle optic may be integrally formed such as by physically removing, such as by grinding or ablation or the like, a portion of the second surface of the front substrate so as to create or establish a physical dish-shaped generally convex-shaped depression or recess or crater at the second surface of the front substrate, and coating the formed depression or recess with a reflector coating or element or the like, such as described in U.S. Pat. No. 8,021,005, incorporated above. The mirror reflective element includes a demarcating layer or band or element that is disposed or established around the perimeter of the reflective element and around the perimeter of the spotter mirror so as to demarcate the spotter mirror from the main reflector portion to enhance the viewability and discernibility of the spotter mirror to the driver of the vehicle, such as by utilizing aspects of the hiding layers described in U.S. Pat. No. 8,736,940, which is hereby incorporated herein by reference in its entirety. The demarcating layer or contrasting coating or layer or material may comprise any suitable material, and may provide a different color or reflectivity or may comprise a dark or opaque color to demarcate the spotter mirror and enhance discernibility of the spotter mirror from the main mirror, which may comprise a flat mirror, a convex mirror or a free form mirror (such as utilizing aspects of the mirrors described in U.S. Pat. No. 8,917,437, which is hereby incorporated herein by reference in its entirety).

The mirror assembly may comprise any suitable construction, such as, for example, a mirror assembly with the reflective element being nested in the mirror casing and with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529,108, or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Des. Pat. Nos. D633,423; D633,019; D638,761 and/or D647,017, and/or International Publication Nos. WO 2010/124064, WO 2011/044312, WO 2012/051500, WO 2013/071070 and/or WO 2013/126719, which are hereby incorporated herein by reference in their entireties (and with electrochromic and prismatic mirrors of such construction are commercially available from the assignee of this application under the trade name INFINITY™ mirror).

Changes and modifications in the specifically described embodiments may be carried out without departing from the principles of the present invention, which is intended to be limited only by the scope of the appended claims as interpreted according to the principles of patent law.

The invention claimed is:

1. An exterior rearview mirror assembly configured for mounting at an exterior portion of a vehicle, said exterior rearview mirror assembly comprising:
   a mirror reflective element having a first electrically conductive element and a second electrically conductive element disposed at a rear side thereof;
   a back plate attached at the rear side of said mirror reflective element, said back plate having an attachment portion at a perimeter region thereof;
   an attaching element having first and second spring-loaded electrical connectors disposed thereat;
   wherein said attaching element comprises a cover element, and wherein said first and second spring-loaded electrical connectors are disposed at said cover element and protrude therefrom;
   wherein said attaching element comprises first and second electrical leads that electrically connect to said first and second spring-loaded electrical connectors, respectively;
   wherein said first and second electrical leads electrically connect to an electrical connector;
   wherein said cover element of said attaching element attaches at said attachment portion of said back plate, and wherein, with said cover element of said attaching element attached at said attachment portion of said back plate, said first and second spring-loaded electrical connectors are encased in a cavity defined at least in part by said cover element and said attachment portion;

wherein, with said cover element of said attaching element attached at said attachment portion of said back plate, and with said back plate attached at the rear side of said mirror reflective element, said first spring-loaded electrical connector contacts and is biased into electrical contact with said first electrically conductive element disposed at the rear side of said mirror reflective element and said second spring-loaded electrical connector contacts and is biased into electrical contact with said second electrically conductive element disposed at the rear side of said mirror reflective element;

wherein said electrical connector attaches at said back plate; and wherein, with said cover element of said attaching element attached at said attachment portion of said back plate, and with said electrical connector attached at said back plate, said electrical connector is disposed at said back plate and configured to electrically connect to a connector of a wire harness of said exterior rearview mirror assembly or of the vehicle to electrically connect said first and second spring-loaded electrical connectors to an electrical power source.

2. The exterior rearview mirror assembly of claim 1, wherein said first electrically conductive element and said second electrically conductive element are part of a heater pad disposed at the rear side of said mirror reflective element.

3. The exterior rearview mirror assembly of claim 1, wherein said electrical connector, with said cover element of said attaching element attached at said attachment portion of said back plate and with said electrical connector attached at said back plate, is electrically connected to a heater pad disposed at a side of said back plate that faces said mirror reflective element when said back plate is attached at the rear side of said mirror reflective element.

4. The exterior rearview mirror assembly of claim 1, wherein said cover element snap attaches to said attachment portion of said back plate.

5. The exterior rearview mirror assembly of claim 1, wherein said attaching element comprises a printed circuit board.

6. The exterior rearview mirror assembly of claim 5, wherein said cover element snap attaches to said attachment portion of said back plate to encase said printed circuit board within the cavity defined at least in part by said cover element and said attachment portion.

7. The exterior rearview mirror assembly of claim 1, wherein said first spring-loaded electrical connector is compressible from an extended state to a compressed state, and wherein said first spring-loaded electrical connector has a length dimension that, when in the extended state, is greater than a distance between said cover element and said first electrically conductive element.

8. The exterior rearview mirror assembly of claim 1, wherein said first spring-loaded electrical connector comprises a first electrically conductive body portion and a second electrically conductive body portion movable relative to said first electrically conductive body portion and in electrical conductivity therewith.

9. The exterior rearview mirror assembly of claim 8, wherein said first electrically conductive body portion comprises a contacting end that, when said cover element of said attaching element is attached at said attachment portion of said back plate, contacts said first electrically conductive element disposed at the rear side of said mirror reflective element, and wherein said second electrically conductive body portion of said first spring-loaded electrical connector comprises a connecting end that electrically connects with said first electrical lead.

10. The exterior rearview mirror assembly of claim 8, wherein said first spring-loaded electrical connector comprises a spring element disposed at least partially in said first and second electrically conductive body portions, and wherein said spring element urges said first electrically conductive body portion outward from said second electrically conductive body portion.

11. The exterior rearview mirror assembly of claim 10, wherein said spring element comprises an electrically conductive spring element.

12. The exterior rearview mirror assembly of claim 10, wherein said spring element of said first spring-loaded electrical connector has a spring force of at least 1 Newton.

13. The exterior rearview mirror assembly of claim 10, wherein said second spring-loaded electrical connector comprises a third electrically conductive body portion and a fourth electrically conductive body portion movable relative to said third electrically conductive body portion and in electrical conductivity therewith, and wherein said second spring-loaded electrical connector comprises a second spring element disposed at least partially in said third and fourth electrically conductive body portions, and wherein said second spring element urges said third electrically conductive body portion outward from said fourth electrically conductive body portion.

14. The exterior rearview mirror assembly of claim 1, wherein said mirror reflective element comprises an electro-optic reflective element having a front substrate and a rear substrate and an electro-optic medium sandwiched therebetween, said front substrate having a first surface and a second surface with a transparent electrically conductive coating at the second surface and in contact with said electro-optic medium, said rear substrate having a third surface and a fourth surface with an electrically conductive coating at the third surface and in contact with said electro-optic medium, and wherein the fourth surface of said rear substrate is at the rear side of said mirror reflective element.

15. The exterior rearview mirror assembly of claim 14, wherein said first electrically conductive element is in electrically conductive connection with said transparent electrically conductive coating at the second surface of said front substrate, and wherein said second electrically conductive element is in electrically conductive connection with said electrically conductive coating at the third surface of said rear substrate.

16. The exterior rearview mirror assembly of claim 15, wherein said first electrically conductive element is in electrically conductive connection with said transparent electrically conductive coating via a first electrically conductive trace established at the fourth surface of said rear substrate and an electrically conductive element that electrically connects said first electrically conductive trace to said transparent electrically conductive coating at the second surface of said front substrate, and wherein said second electrically conductive element is in electrically conductive connection with said electrically conductive coating via a second electrically conductive trace established at the fourth surface of said rear substrate and an electrically conductive element that electrically connects said second electrically conductive trace to said electrically conductive coating at the third surface of said rear substrate.

17. The exterior rearview mirror assembly of claim 14, wherein said electro-optic reflective element comprises an electrochromic reflective element having an electrochromic medium sandwiched between said front substrate and said rear substrate.

18. An exterior rearview mirror assembly configured for mounting at an exterior portion of a vehicle, said exterior rearview mirror assembly comprising:
- a mirror reflective element having a first electrically conductive element and a second electrically conductive element disposed at a rear side thereof;
- a back plate attached at the rear side of said mirror reflective element, said back plate having an attachment portion at a perimeter region thereof;
- an attaching element having first and second spring-loaded electrical connectors disposed thereat;
- wherein said attaching element comprises a cover element, and wherein said first and second spring-loaded electrical connectors are disposed at said cover element and protrude therefrom;
- wherein said attaching element comprises first and second electrical leads that electrically connect to said first and second spring-loaded electrical connectors, respectively;
- wherein said first and second electrical leads electrically connect to an electrical connector;
- wherein said cover element of said attaching element attaches at said attachment portion of said back plate, and wherein, with said cover element of said attaching element attached at said attachment portion of said back plate, said first and second spring-loaded electrical connectors are encased in a cavity defined at least in part by said cover element and said attachment portion;
- wherein each of said first spring-loaded electrical connector and said second spring-loaded electrical connector comprises a spring element that urges the respective one of said first spring-loaded electrical connector and said second spring-loaded electrical connector toward an extended state;
- wherein said spring element of said first spring-loaded electrical connector has a spring force of at least 1 Newton;
- wherein, with said cover element of said attaching element attached at said attachment portion of said back plate, and with said back plate attached at the rear side of said mirror reflective element, said first spring-loaded electrical connector contacts and is biased into electrical contact with said first electrically conductive element disposed at the rear side of said mirror reflective element and said second spring-loaded electrical connector contacts and is biased into electrical contact with said second electrically conductive element disposed at the rear side of said mirror reflective element; and
- wherein, with said cover element of said attaching element attached at said attachment portion of said back plate, said electrical connector is disposed at said back plate and configured to electrically connect to a connector of a wire harness of said exterior rearview mirror assembly or of the vehicle to electrically connect said first and second spring-loaded electrical connectors to an electrical power source.

19. The exterior rearview mirror assembly of claim 18, wherein said electrical connector, with said cover element of said attaching element attached at said attachment portion of said back plate, is electrically connected to a heater pad disposed at a side of said back plate that faces said mirror reflective element when said back plate is attached at the rear side of said mirror reflective element.

20. The exterior rearview mirror assembly of claim 18, wherein said cover element snap attaches to said attachment portion of said back plate.

21. The exterior rearview mirror assembly of claim 18, wherein said first spring-loaded electrical connector is compressible from the extended state to a compressed state, and wherein said first spring-loaded electrical connector has a length dimension that, when in the extended state, is greater than a distance between said cover element and said first electrically conductive element.

22. The exterior rearview mirror assembly of claim 18, wherein said first spring-loaded electrical connector comprises a first electrically conductive body portion and a second electrically conductive body portion movable relative to said first electrically conductive body portion and in electrical conductivity therewith, and wherein said spring element is disposed between said first and second electrically conductive body portions and urges said first electrically conductive body portion outward from said second electrically conductive body portion.

23. The exterior rearview mirror assembly of claim 18, wherein said spring element comprises an electrically conductive spring element.

24. An exterior rearview mirror assembly configured for mounting at an exterior portion of a vehicle, said exterior rearview mirror assembly comprising:
- a mirror reflective element having a first electrically conductive element and a second electrically conductive element disposed at a rear side thereof;
- a back plate attached at the rear side of said mirror reflective element, said back plate having an attachment portion at a perimeter region thereof;
- an attaching element having first and second spring-loaded electrical connectors disposed thereat;
- wherein said attaching element comprises a cover element, and wherein said first and second spring-loaded electrical connectors are disposed at said cover element and protrude therefrom;
- wherein said attaching element comprises first and second electrical leads that electrically connect to said first and second spring-loaded electrical connectors, respectively;
- wherein said first and second electrical leads electrically connect to an electrical connector;
- wherein said cover element of said attaching element attaches at said attachment portion of said back plate, and wherein, with said cover element of said attaching element attached at said attachment portion of said back plate, said first and second spring-loaded electrical connectors are encased in a cavity defined at least in part by said cover element and said attachment portion;
- wherein each of said first and second spring-loaded electrical connectors is compressible from an extended state to a compressed state, and wherein each of said first and second spring-loaded electrical connectors has a length dimension that, when in the extended state, is greater than a distance between said cover element and the respective one of said first and second electrically conductive elements;
- wherein, with said cover element of said attaching element attached at said attachment portion of said back plate, and with said back plate attached at the rear side of said mirror reflective element, said first spring-loaded electrical connector contacts and is biased into electrical contact with said first electrically conductive element disposed at the rear side of said mirror reflective element and said second spring-loaded electrical connector contacts and is biased into electrical contact with said second electrically conductive element disposed at the rear side of said mirror reflective element;

wherein, with said cover element of said attaching element attached at said attachment portion of said back plate, said electrical connector is disposed at said back plate and configured to electrically connect to a connector of a wire harness of said exterior rearview mirror assembly or of the vehicle to electrically connect said first and second spring-loaded electrical connectors to an electrical power source; and wherein said electrical connector, with said cover element of said attaching element attached at said attachment portion of said back plate, is electrically connected to a heater pad disposed at a side of said back plate that faces the rear side of said mirror reflective element when said back plate is attached at the rear side of said mirror reflective element.

25. The exterior rearview mirror assembly of claim 24, wherein said first electrically conductive element and said second electrically conductive element are part of the heater pad disposed at the side of said back plate that faces the rear side of said mirror reflective element.

26. The exterior rearview mirror assembly of claim 24, wherein said attaching element comprises a printed circuit board that is encased within the cavity defined at least in part by said cover element and said attachment portion.

27. The exterior rearview mirror assembly of claim 26, wherein said cover element snap attaches to said attachment portion of said back plate to encase said printed circuit board within the cavity defined at least in part by said cover element and said attachment portion.

* * * * *